US012033054B2

United States Patent
Baker et al.

(10) Patent No.: US 12,033,054 B2
(45) Date of Patent: *Jul. 9, 2024

(54) DATA-DEPENDENT NODE-TO-NODE KNOWLEDGE SHARING BY REGULARIZATION IN DEEP LEARNING

(71) Applicant: D5AI LLC, Maitland, FL (US)

(72) Inventors: James K. Baker, Maitland, FL (US); Bradley J. Baker, Berwyn, PA (US)

(73) Assignee: D5AI LLC, Maitland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,698

(22) Filed: Jul. 17, 2023

(65) Prior Publication Data

US 2023/0359860 A1 Nov. 9, 2023

Related U.S. Application Data

(63) Continuation of application No. 17/760,398, filed as application No. PCT/US2020/027912 on Apr. 13, 2020, now Pat. No. 11,741,340.

(60) Provisional application No. 62/993,163, filed on Mar. 23, 2020.

(51) Int. Cl.
*G06N 3/04* (2023.01)
*G06F 18/40* (2023.01)

(52) U.S. Cl.
CPC ............... *G06N 3/04* (2013.01); *G06F 18/41* (2023.01)

(58) Field of Classification Search
CPC .......... G06N 20/00; G06N 3/047; G06N 7/01; G06N 3/049; G06N 3/04; G06F 18/41
See application file for complete search history.

(56) References Cited

U.S. PATENT DOCUMENTS

| 2016/0162783 | A1 | 6/2016 | Tan et al. |
| 2017/0109322 | A1 | 4/2017 | McMahan et al. |
| 2018/0018553 | A1 | 1/2018 | Bach et al. |

(Continued)

FOREIGN PATENT DOCUMENTS

| WO | 2018175098 A1 | 9/2018 |
| WO | 2019067960 A1 | 4/2019 |
| WO | 2021194516 A1 | 9/2021 |

OTHER PUBLICATIONS

International Search Report and Written Opinion for corresponding International PCT Application No. PCT/US2020/027912, dated Jul. 1, 2020.

(Continued)

*Primary Examiner* — Alan Chen
(74) *Attorney, Agent, or Firm* — K&L Gates LLP

(57) ABSTRACT

Data-dependent node-to-node knowledge sharing to increase the interpretability of the activation pattern of one or more nodes in a neural network, is implemented by a set of knowledge sharing links. Each link may comprise a knowledge providing node or other source P and a knowledge receiving node R. A knowledge sharing link can impose a node-specific regularization on the knowledge receiving node R to help guide the knowledge receiving node R to have an activation pattern that is more easily interpreted. The specification and training of the knowledge sharing links may be controlled by a cooperative human-AI learning supervisor system in which a human and an artificial intelligence system work cooperatively to improve the interpretability and performance of the client system.

37 Claims, 6 Drawing Sheets

(56) References Cited

U.S. PATENT DOCUMENTS

| | | |
|---|---|---|
| 2019/0095798 A1 | 3/2019 | Baker |
| 2020/0184337 A1 | 6/2020 | Baker |
| 2020/0285939 A1 | 9/2020 | Baker |
| 2020/0401869 A1 | 12/2020 | Baker et al. |
| 2021/0256377 A1 | 8/2021 | Dalli et al. |
| 2022/0027679 A1 | 1/2022 | Jesus et al. |

OTHER PUBLICATIONS

McGarry et al., Knowledge Transfer between Neural Networks, Researchgate (Jun. 2003), pp. 1-6.

Hjelm et al., Learning Deep Representations by Mutual Information Estimation and Maximization, ICLR 2019 Conference Blind Submission (Sep. 27, 2018; modified Feb. 10, 2022), pp. 1-24.

ONLY A FEW REPRESENTIVE CONNECTIONS ARE SHOWN

DATA-DEPENDENT NODE-TO-NODE KNOWLEDGE SHARING BY REGULARIZATION IN DEEP LEARNING

PRIORITY CLAIM

The present application claims priority as a continuation to U.S. patent application Ser. No. 17/760,398, filed Aug. 9, 2022, which is a national stage application under 35 U.S.C. § 371 of PCT Application No. PCT/US20/27912, filed Apr. 13, 2020, which claims priority to U.S. provisional patent application Ser. No. 62/993,163, filed Mar. 23, 2020, having the same inventors and title as stated above, and which is incorporated herein by reference in its entirety.

BACKGROUND

Artificial intelligence systems, including deep neural networks, have had great success in recent years. However, many problems remain. It is often very difficult to interpret the inner workings of a large deep neural network. Moreover, except for output nodes, when a node has an activation pattern that is easily human interpretable, there is no mechanism by which the system knows that the node might be interpretable, much less a mechanism by which the system may communicate that knowledge to a human user or to other nodes or to other networks in the system. In addition, although normal training may sometimes lead a node to learn an activation pattern that happens to be interpretable, there is no mechanism to train deliberately a node in a classifier network to be more interpretable.

SUMMARY

To increase the interpretability of the activation pattern of one or more nodes in a neural network, the present invention can use, in one general aspect, a process herein called "data-dependent node-to-node knowledge sharing." The data-dependent node-to-node knowledge sharing may be implemented by a set of "knowledge sharing links." Each link may comprise a knowledge providing node or other source P and a knowledge receiving node R. A knowledge sharing link can impose a node-specific regularization on the knowledge receiving node R to help guide the knowledge receiving node R to have an activation pattern that is more easily interpreted. The specification and training of the knowledge sharing links may be controlled by a cooperative human-AI learning supervisor system in which a human and an artificial intelligence system work cooperatively to improve the interpretability and performance of the client system. The repeated, interactive cooperation between one or more humans and an AI system in the learning supervisor system enables the learning supervisor system to supervise the training of the client systems better than either a human supervisor or an AI supervisor could do alone. A human is the ultimate judge of whether an interpretation of a node in a neural network is correct and understandable by a human. The AI component of the learning supervisor system can guide the knowledge sharing of an interpretation confirmed by a human to many other nodes throughout the client systems. This process can continue back and forth. As more nodes learn their designated interpretations well, they become easier for a human to confirm. As more nodes receive confirmation of their interpretations, the more effective becomes the knowledge sharing.

These and other benefits realizable through the present invention will be apparent from the description to follow.

FIGURES

Various embodiments of the present invention are described herein by way of example in conjunction with the following figures.

DESCRIPTION

Figure 1:
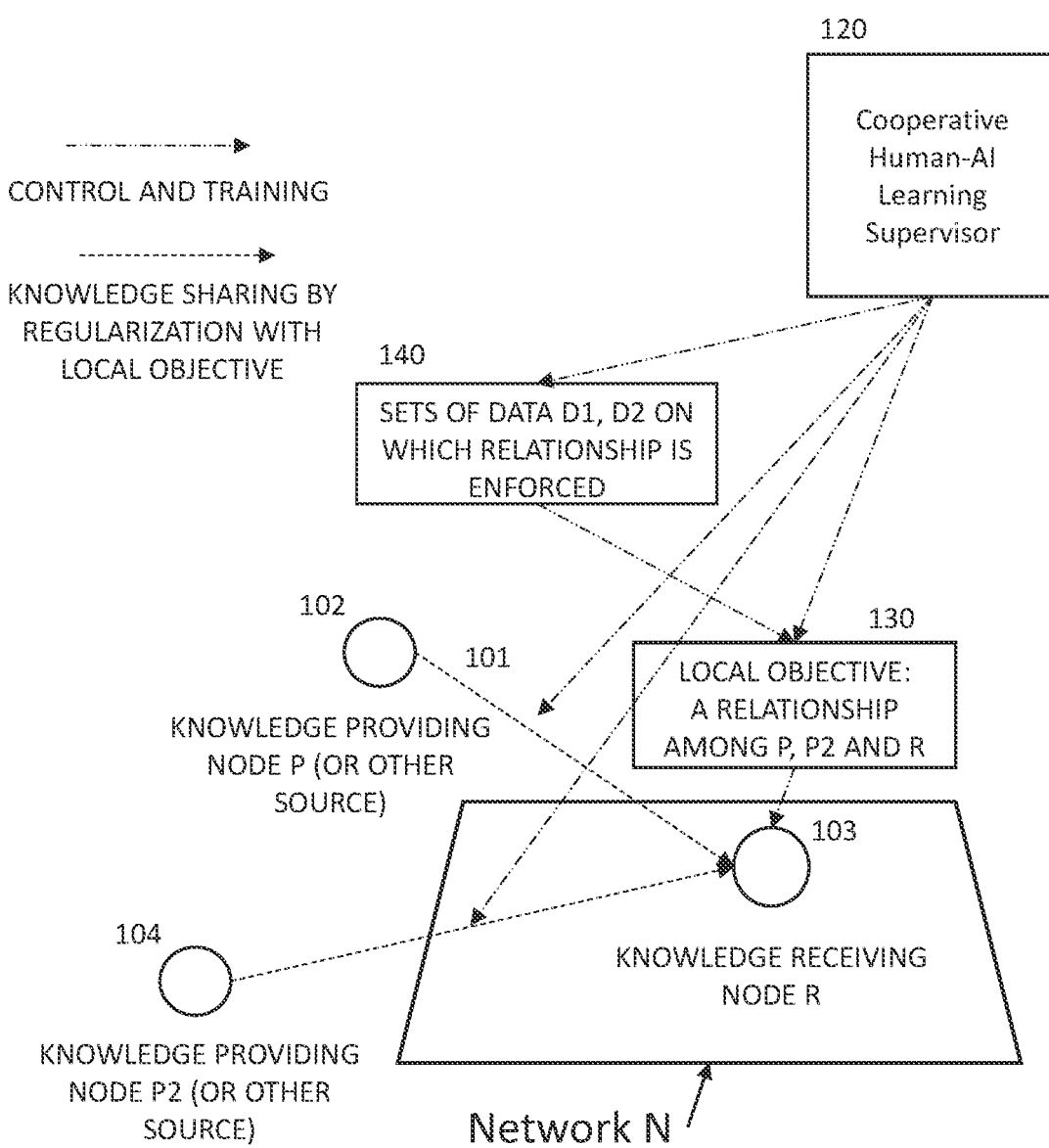
FIG. 1 is a diagram of a knowledge sharing link and its associated nodes and a learning supervisor system to control the training process according to various embodiments of the present invention.

FIG. 1 is a diagram of a knowledge sharing link used in various embodiments of the invention. Various embodiments of the invention implement a process herein called "data-dependent node-to-node knowledge sharing." Data-dependent node-to-node knowledge sharing in a neural network N may be implemented by a form of node-to-node regularization during the training of network N. A knowledge sharing link is a link (101 in FIG. 1) from a knowledge providing node P (102 in FIG. 1) or other source to a knowledge receiving node R (103 in FIG. 1) in network N on which, for a given set of data D1 (140), a machine-learning computer system, such as in one embodiment the cooperative human-AI learning supervisor system 120 shown in FIG. 1, imposes a local objective (130) that regularizes node R to better satisfy some specified relationship between the activation of node R on each datum d in D1 and the activation of node P on datum d, as specified by the machine-learning computer system (e.g., the learning supervisor system 120). The local objective may be in addition to a "global objective" used for training the network N generally, which network N includes the node R. In some embodiments, the knowledge providing source P may be a source other than a node in a neural network (other than the neural network N to which node R belongs). For example, the knowledge providing source P may be a source in an external knowledge repository. In some embodiments, node R may be a knowledge receiving node for a plurality of knowledge providing sources, as illustrated by P and P2. In various embodiments, knowledge providing source P, knowledge providing source P2 and/or additional knowledge providing sources may be nodes in network N, nodes in other networks (i.e., a network external to network N) or external knowledge sources that may be neural networks or other forms of knowledge representation, such as ontologies, mereologies, dictionaries or others. A network is "external" to network N if it is not trained with the network N.

A set of training data T may be set aside for training the network N. In some embodiments, D1 may comprise all the training data (e.g., all of the data in the training data set T) except data in the training data set T that is set aside for testing purposes. In other embodiments, the training data set D1 is a subset of the training data set T.

In some embodiments, the cooperative human-AI learning supervisor system 120 may specify a second set of data D2 (of the training data set T) on which the learning supervisor system 120 imposes an additional local objective (130) that regularizes node R to satisfy a second relationship between the activation of node R on each datum d in D2 and the activation of node P on datum d. Sets D1 and D2 may be disjoint, or may overlap. In some embodiments, D1 and/or D2 may comprise data that has been set aside for preliminary development testing (such as T2 in block 401 of FIG. 4, where T2 is a subset of T, as described below).

In some embodiments, the specified relationship associated with the knowledge sharing link 101 between node P and node R may be that the activations for nodes P and R have the objective of being equal on some specified set of data D1 (140). In some embodiments, the knowledge providing node P (102 in FIG. 1) may have a known interpretation, so the effect of the local objective will be to regularize the knowledge receiving node R (103 in FIG. 1) with the objective of having the same interpretation as the knowledge sending node P (102 in FIG. 1) on the set of data D1 (140). However, knowledge receiving node R (103 in FIG. 1) will also be training to satisfy the output objective of the neural network comprising R and node R may also be training as a knowledge receiving node with respect to other knowledge providing nodes in addition to knowledge providing node P (102 in FIG. 1). In such a case, node R will be trained to meet these multiple objectives as best it can.

Some example relationships for nodes R and P include:

$$\text{act}_R(d) = \text{act}_P(d), \quad\quad\quad 1)$$

$$\text{act}_R(d) \leq \text{act}_P(d), \quad\quad\quad 2)$$

$$\text{act}_R(d) \geq \text{act}_P(d), \quad\quad\quad 3)$$

$$\text{act}_R(d) \neq \text{act}_P(d), \quad\quad\quad 4)$$

where $\text{act}_R(d)$ and $\text{act}_P(d)$ refer to the activations of nodes R and P respectively on datum d. In various embodiments, these numerical relationships may hold only to some degree of approximation.

Some example cost functions that can be minimized in the training of the network N to regularize the node R for the above-listed relationships between R and P include:

$$\text{Cost}_{1a} = (\text{act}_R(d) - \text{act}_P(d))^2, \text{ or } \text{Cost}_{1b} = |\text{act}_R(d) - \text{act}_P(d)|,$$

$$\text{Cost}_2 = \text{Max}(0, \text{act}_R(d) - \text{act}_P(d)),$$

$$\text{Cost}_3 = \text{Max}(0, \text{act}_P(d) - \text{act}_R(d)),$$

$$\text{Cost}_4 = \text{Max}(0, \text{Pen} - |\text{act}_R(d) - \text{act}_P(d)|), \text{ for some specified maximum penalty Pen}.$$

In some embodiments, some function of the activation of one or both nodes in a link may be used rather than the activation value itself. For example, the learning supervisor system 120 may specify a threshold activation value $\text{Th}_P$ for node P and a threshold activation value $\text{Th}_R$ for node R and then specify a desired relationship between the Boolean variables $V_P(d) = \{\text{act}_P(d) \geq \text{Th}_P\}$ and $V_R(d) = \{\text{act}_R(d) \geq \text{Th}_R\}$. Some embodiments may map activation values to a discrete set using multiple thresholds.

Some example embodiments in which learning supervisor system 120 imposes a local objective on node R based on the Boolean variables $V_P(d)$ and $V_R(d)$ (and, in some embodiments, $V_{P2}(d)$, defined on a second knowledge providing node P2) are $$V_R(d) = V_P(d), \quad\quad\quad 5)$$

$$V_R(d) \neq V_P(d), \text{ or equivalently } V_R(d) \text{ XOR } V_P(d), \quad\quad\quad 6)$$

$$V_R(d) = V_P(d) \text{ AND } V_{P2}(d), \quad\quad\quad 7)$$

$$V_R(d) = V_P(d) \text{ OR } V_{P2}(d), \quad\quad\quad 8)$$

$$\text{if } V_P(d) \text{ then } V_R(d), \text{ and} \quad\quad\quad 9)$$

$$\text{if } V_R(d) \text{ then } V_P(d). \quad\quad\quad 10)$$

The cost function for these Boolean examples may be a fixed penalty value $\text{Pen}_R$ for node R, imposed when the desired Boolean relationship is violated. $\text{Pen}_R$ may be a hyperparameter controlled by the learning supervisor system 120. In some embodiments, the learning supervisor system 120 may impose a local objective on node R involving a joint relationship among two knowledge providing sources P (102 in FIG. 1) and P2 (104) and R (103), such as, for example, objectives (7) and (8) in the above list.

In some embodiments, the learning supervisor system 120 may impose a local objective only when datum d is in a subset D1 that is selected depending on $V(d)_P$, $V(d)_{P2}$, or $V_R(d)$, and possibly to impose a different objective when datum d is in D2. For example, an alternate embodiment of objective (9) above is for the learning supervisor system 120 to impose objective (5) above only when $V_P(d)$ is true (as the set D1). An alternate embodiment of objective (8) is to impose objective (5) when $V_{P2}(d)$ is false (as set D1) and to impose $V_R(d) = $ true when $V_{P2}(D)$ is true (as set D2). In embodiments for various applications, the learning supervisor system 120 may choose among various possible embodiments of a desired relationship.

Figure 5:
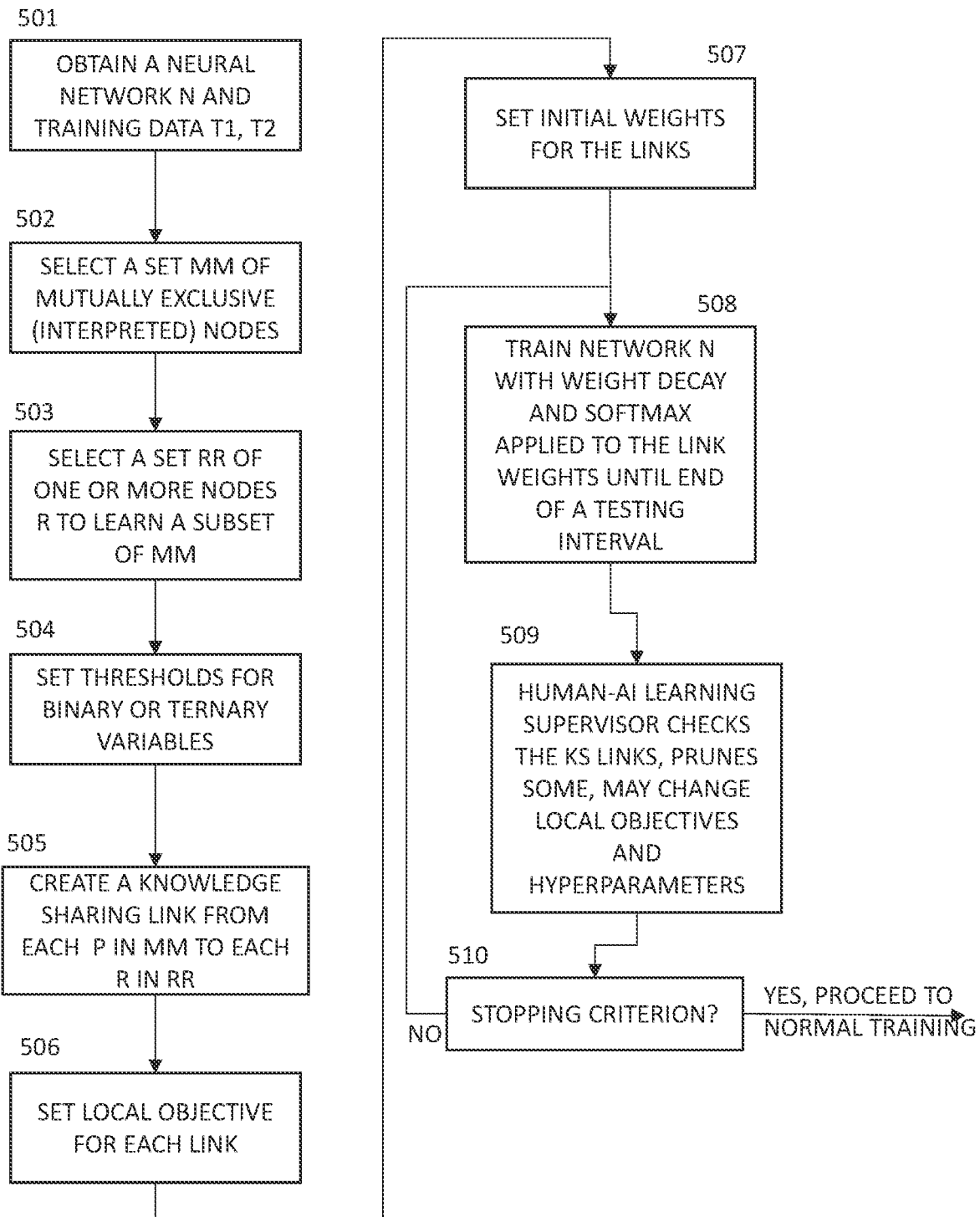
FIG. 5 is a flowchart of an aspect of training knowledge sharing links according to various embodiments of the present invention.

In some embodiments, the learning supervisor system 120 may impose a local objective on node R based on one relationship for data in set D1 and a local objective based on an unrelated relationship for data in set D2. This capability lets the learning supervisor system 120 represent an interpretation for a node that has learned to represent different knowledge in different circumstances. In some embodiments, the learning supervisor system 120 may train a node R to represent such multiple objectives. In some embodiments, the learning supervisor system 120 may use a procedure such as illustrated in FIG. 5 to discover an interpretation of a node that has learned such a dual local objective even when the dual local objective has not been specified by the learning supervisor system 120.

The example relationships (1) to (10) above may represent relationships that have various names in specific domains of discourse, such as "is a kind of" in an ontology; "is a part of" in a mereology; "is a superset of" or "is a subset of" in set theory; "if P then R" or "if R then P" in philosophy and logical inference; or "NOT", "AND", "OR" or "XOR" in Boolean logic. These names and others may be used in an external knowledge repository, such as external knowledge repositories 208 in FIG. 2 or 322 in FIG. 3. In some embodiments, knowledge providing sources 102 or 104 in FIG. 1 may be external knowledge (external to network N) about the data in D1 and/or D2 (140) in terms of the output categories of a classifier or other names associated with data in D1 and/or D2. Knowledge receiving node R (103) may learn an interpretation in terms of these external names instead of, or in addition to, learning an interpretation in terms of the output categories of the neural network comprising R.

In some embodiments, in some knowledge sharing links, for one or both nodes the weighted sum of the inputs to the node may be used rather than the output activation of the node. For example, such an embodiment may be used when the two nodes have different activation functions. The operation of computing the weighted sum of the inputs occurs for most nodes in a typical neural network and is well known to those skilled in the art of neural networks. Similarly, in a set of softmax nodes, the inputs to the softmax operation may be used rather than the normalized results of the softmax operation. The softmax operation is well known to those skilled in the art of neural networks.

The training and control of data-dependent node-to-node knowledge sharing links, including the assignment of the relationship associated with each link, are managed preferably by a cooperative human-artificial intelligence learning supervisor system (120 in FIG. 1), in which the human and the artificial intelligence system cooperate and have complementary roles in the design and training of the neural networks being trained. The learning supervisor system 120 specifies the local objective 130, which defines the desired relationship between node P (102) and node R (103). The learning supervisor system 120 also specifies the sets D1 and D2 (140) on which the local objective 130 is to be enforced. The set D1 may comprise all the training data (the training data set T) available for training the network N comprising node R. In some embodiments, in some aspects of the invention, the set D1 or D2 may comprise data that has been set aside from the set of training data T to be used for training the neural network N comprising node R. The learning supervisor system 120 may also control a parameter or hyperparameter that specifies a relative weight for the link 101 compared to other links for which R is a knowledge receiving node. In addition, the learning supervisor system 120 may control a learning rate hyperparameter $\beta_R$ for all the links to node R or for all links to a set of nodes comprising R.

The learning supervisor system 120 is a system in which one or more humans cooperate with an artificial intelligence supervisor system to specify the knowledge sharing links and to control the overall learning process of a system of neural networks comprising knowledge sharing links. In cooperative learning supervisor system 120, the human or humans (302 in FIG. 3) and the AI system (312 in FIG. 3) in the learning supervisor system work interactively in a cooperative relationship rather than a master-slave relationship.

The AI system (312 in FIG. 3) and the one or more humans (302) participating in the supervision of the training process each do tasks best suited to their capabilities. For example, the definition of a node being "interpretable" is that a human can understand the activation pattern of the node as a function of the input data and express that understanding in words. The humans may also confirm a tentative interpretation of a node supplied by the AI system (312) in the learning supervisor system.

The AI system (312) in the learning supervisor system (120) may, for example, propagate any confirmed interpretation of a node through knowledge sharing with many other nodes, perhaps many thousands or even millions of nodes scattered throughout a large network or over many networks. This is a task that is not practical for a human to do by hand.

The repeated, cooperative interaction of the humans (302) and the AI system (312) in the learning supervisor system (120) may become even more effective as the process is repeated. At first, perhaps only a few nodes have behavior that matches an intended interpretation well enough to be confirmed. As the AI propagates the knowledge of each confirmed node to many other nodes, more nodes may become trained well enough to be confirmed. Human confirmation of a selection of those nodes may lead to many more nodes becoming well-trained to an interpretation. During the iterative training of the client neural networks, the cooperation between the humans (302) and the AI system (312) in the learning supervisor system may become increasingly efficient.

Figure 6:
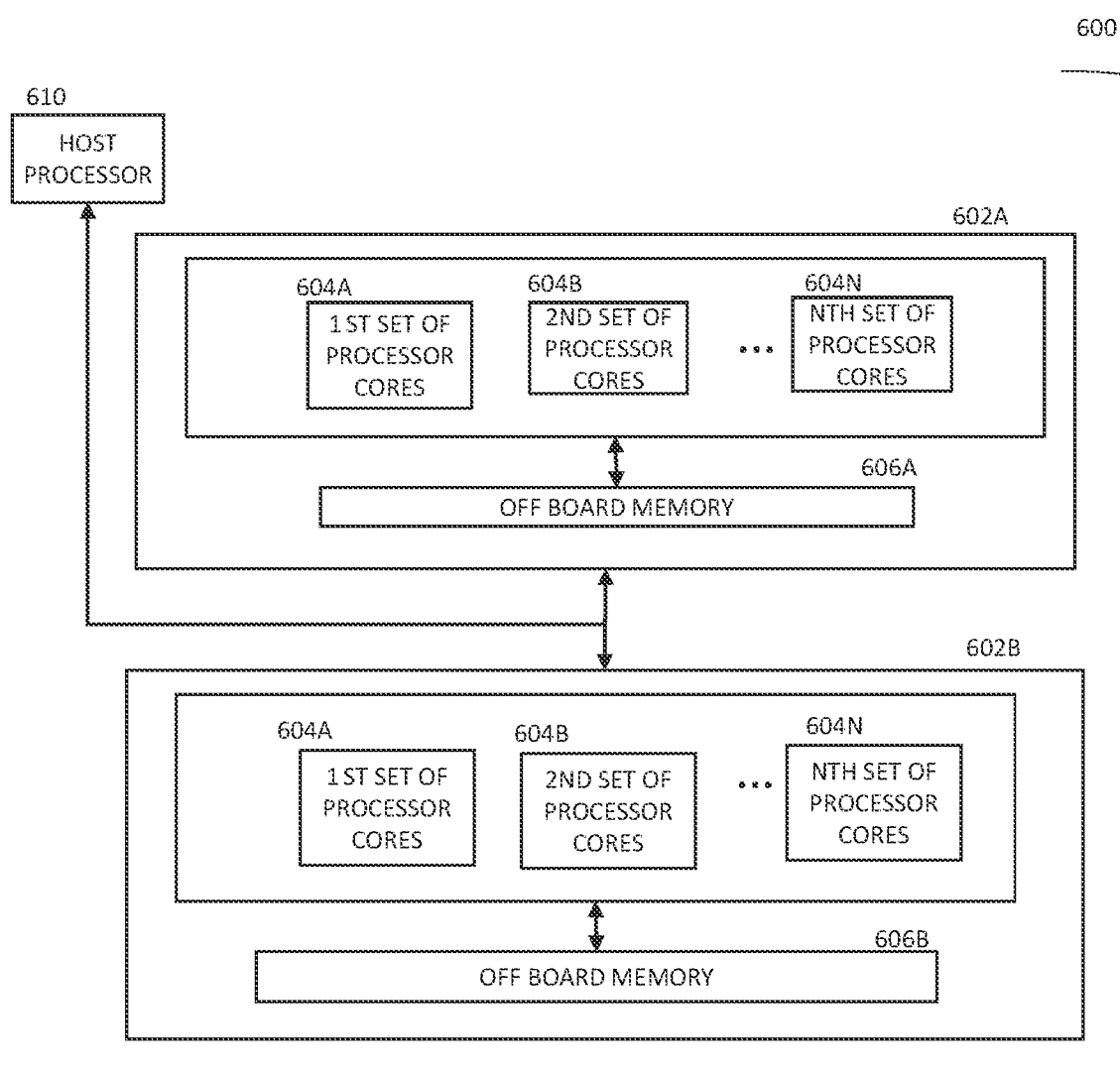
FIG. 6 is a system diagram of a computer system on which various embodiments of the present invention may be implemented.

In an embodiment of the invention, the AI system (312) in the learning supervisor system and associated subsystems may be implemented on a computer system such as computer system 600 in FIG. 6. The phrase "the human-AI learning supervisor system (takes an action)" in FIGS. 4 and 5 (see e.g., steps 402 and 509) means that the computer system 600 implementing the artificial intelligence system takes an action possibly interacting with the one or more cooperating humans. The cooperative human-AI learning supervisor system 120 will be discussed further in association with FIGS. 2 and 3.

In some embodiments, the node R may be in a different network than node P is in. That is, node P may be part of network N in FIG. 1 or not. The regularization of a data-dependent node-to-node knowledge sharing link from node P to node R is applied when the network N comprising R is being trained. The network comprising node P (if node P is not part is network N) is not necessarily being trained at the same time.

One purpose of a node-to-node knowledge sharing link is to spread knowledge from a node P with a known interpretation to a node R that has or is desired to have an interpretation that satisfies the specified relationship with respect to the known interpretation of node P. This process helps make the behavior of node R become more interpretable. The process of node-to-node knowledge sharing may thus spread interpretations throughout one or more networks. In some embodiments, this process starts with the output nodes of a classifier in which the known interpretation of an output node is the category identified with that output node.

Figure 2:
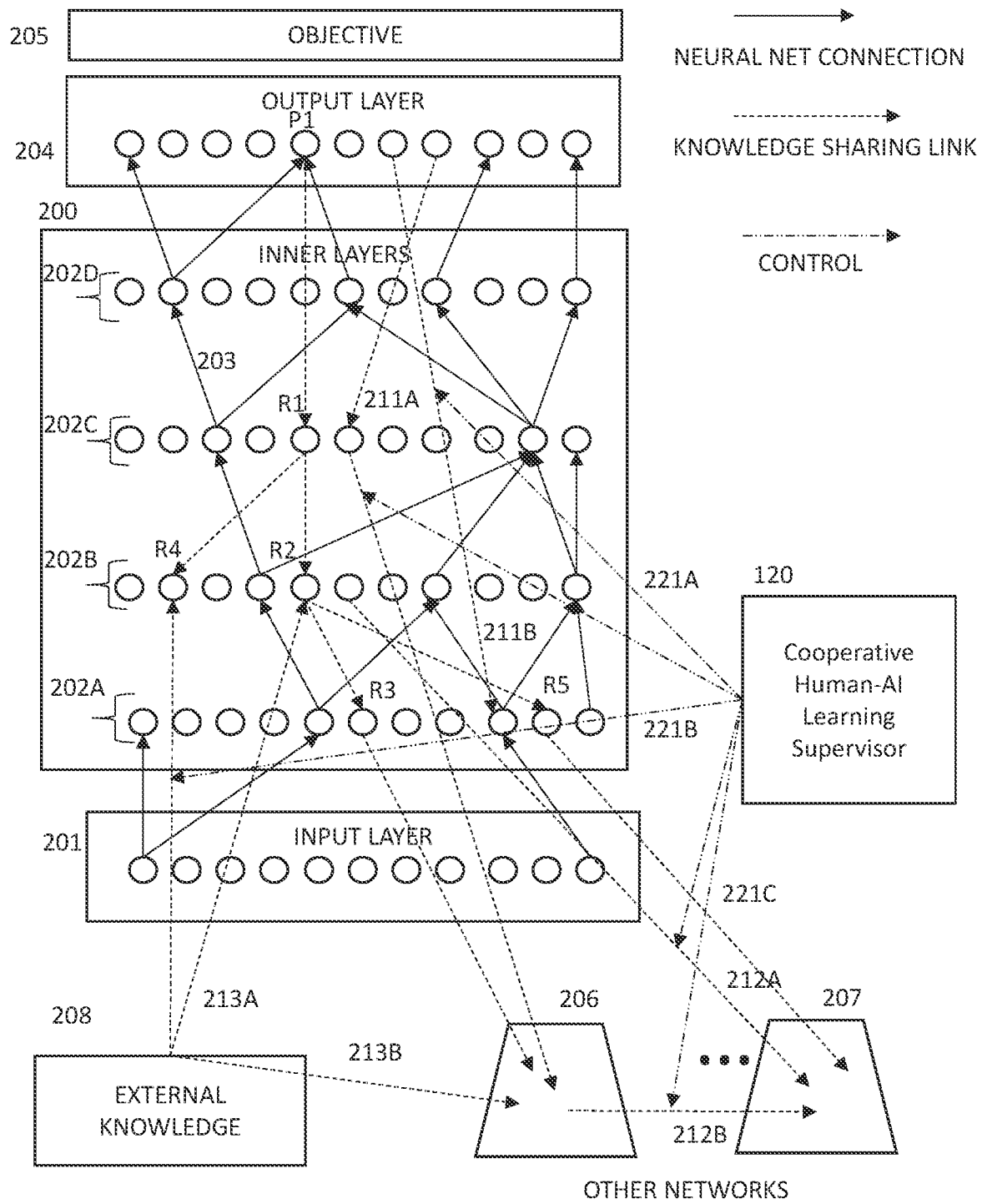
FIG. 2 is a diagram of a neural network and knowledge sharing links within the neural network and between nodes in the neural network and other neural networks and to a node in the network from an external knowledge repository according to various embodiments of the present invention.

FIG. 2 is a simplified diagram of an illustrative embodiment of the present invention. The dashed-line arrows in FIG. 2 represent data-dependent node-to-node knowledge sharing links. The direct purpose of a data-dependent node-to-node knowledge sharing link is to propagate to one or more other nodes an interpretation of the activation of a node P in response to a datum d. This propagation of node interpretations may make the network much easier to interpret and, in the process, may achieve several additional goals. The knowledge sharing serves as a regularizer, improving performance on new, previously unseen data and making the network less prone to errors due to overfitting. The knowledge sharing may also help prevent a problem common to very deep neural networks, namely a vanishing gradient. The knowledge sharing links may be created by, trained by, and controlled by cooperative human-AI learning supervisor system 120, as described herein.

The circles, solid-line arrows and boxes 200, 201 and 204 in FIG. 2 represent a layered feed-forward neural network, which can be the network N of FIG. 1. A layered neural network comprises multiple layers, with each layer comprising one or more nodes, represented by the circles in FIG. 2. A layered feed-forward neural network has an input layer (201), zero or more inner layers (202A-D), and an output layer (204). Each of the layers has one or more nodes. The input layer 201 is considered the lowest layer in the network and the output layer is considered the highest layer, such that the input layer is lower than the middle layers and the output layer, and the middle layers (if any) are lower than the output layer. If the neural network is a classifier or pattern recognition system being trained, there is an objective 205 (i.e., the "global objective") for the training of the network. Typically, the global objective (205) specifies, for each training datum, the desired value for each node in the output layer (204). The global objective is different from the local objective that is used to regularize the node R in the network. The layered neural network further comprises a number of directed arcs or connections, illustrated by solid-line arrows in FIG. 2, such as arrow 203. Each directed arc or connection goes from a source node in a lower layer of the network to a destination node in a higher layer of the network.

For the purpose of clarity of illustration, only a few of the connections of the neural network illustrated in FIG. 2 are shown. For example, in a common type of feed-forward neural network, every node in each layer is connected to every node in the next higher layer. A source node may also be connected to a destination node in a layer higher than the next layer. Some more specialized types of neural networks, such a convolutional neural network (CNN), are special cases of layered feed-forward neural networks. Some other types of neural networks, such as a recurrent neural network (RNN), may be represented for training purposes by a feed-forward neural network that approximates the RNN. Embodiments of this invention may be applied to any type of layered feed-forward neural network or any neural network that can be represented as a layered feed-forward neural network. In fact, an embodiment of this invention may train any neural network that may be represented as a directed acyclic graph, a class which includes all layered feed-forward neural networks.

Also shown in FIG. 2 are two other neural networks 206 and 207, along with an external knowledge repository 208. Although only two other neural networks are shown, the number of other neural networks with links to or from the first neural network N (that is, the network comprising layers 200, 201 and 204) is unlimited, as indicated by the ellipsis " . . . " between network 206 and network 207 in FIG. 2.

FIG. 2 also shows three varieties of data-dependent node-to-node knowledge sharing links, illustrated by dashed-line arrows such as 211A-B, 212A-B and 213A-B. A data-dependent node-to-node knowledge sharing link is an additional mechanism superimposed on a neural network. As its name implies, the purpose of a data-dependent node-to-node knowledge sharing link is to pass a certain kind of knowledge from the link's knowledge providing node P to the link's knowledge receiving node R. The knowledge providing node P of the link and the knowledge receiving node R of the link may be in the same network, as illustrated by links 211A-B within network N between layer sections 200, 204 and the sequence of links P1→R1, R2→R2 and R2→R3. Although each of the links within network N in FIG. 2 link a knowledge providing node to a knowledge receiving node that is a lower layer than the knowledge providing node, the knowledge providing node and the knowledge receiving node may also be in the same layer. In some embodiments, the knowledge receiving node may be in a higher layer than the knowledge providing node, with some restrictions as described in association with FIG. 4. They may be in two different networks, as illustrated by links 212A-B (links going from section 200 of network N and from network 206, respectively, to network 207). The knowledge providing source P of a link may be in the external knowledge repository 208 with the knowledge receiving node R in a neural network, as illustrated by links 213A-B (going respectively to node R2 in section 200 of network N and to an unspecified node in network 206) in section 200 of network N).

The machine-learning computer system is a computer system (see FIG. 6) that may control all aspects of the training and testing of the neural networks illustrated in FIG. 2. The machine-learning computer system may be implemented, in various embodiments, with a cooperative human-AI learning supervisor system 120 as shown in FIG. 1. FIG. 2 depicts an embodiment of the cooperative human-AI learning supervisor system 120 in more details. The learning supervisor system 120 may control the data-dependent node-to-node knowledge sharing links, such as links 211A-B, 212A-B and 213A-B, as indicated by the dash-dot-dot arrows, such as arrows 221A-C emanating from the learning supervisor system 120. The cooperative human-AI learning supervisor system 120 is a system comprising a cooperative effort by one or more humans and an artificial intelligence system that has been specifically trained to control the training and optimize the performance of client neural networks such as the neural networks illustrated in FIG. 2.

The cooperation of the humans (302 in FIG. 3) and the AI system (312 in FIG. 3) in the learning supervisor system 120 may help make the training of neural networks 200, 206, 207 (and any other networks) more accurate and especially may help make the networks more interpretable. The benefit of this cooperation is apparent in the situation in which there is a virtual tree of nodes with each knowledge receiving node being a knowledge providing node for one or more knowledge receiving nodes until the end of each chain, as illustrated by the tree in FIG. 2 starting from output node P1 and going to R1, then to R2, and then from R2 to R3 and R4, and then to nodes in networks 206 and 207. To simplify the illustration, FIG. 2 only shows a few examples of the many possible links.

As the humans (302 in FIG. 3) confirm some of the tentative interpretations, many more nodes may learn interpretations that are good enough to confirm. These confirmed nodes may in turn help more nodes learn interpretations.

Figure 3:
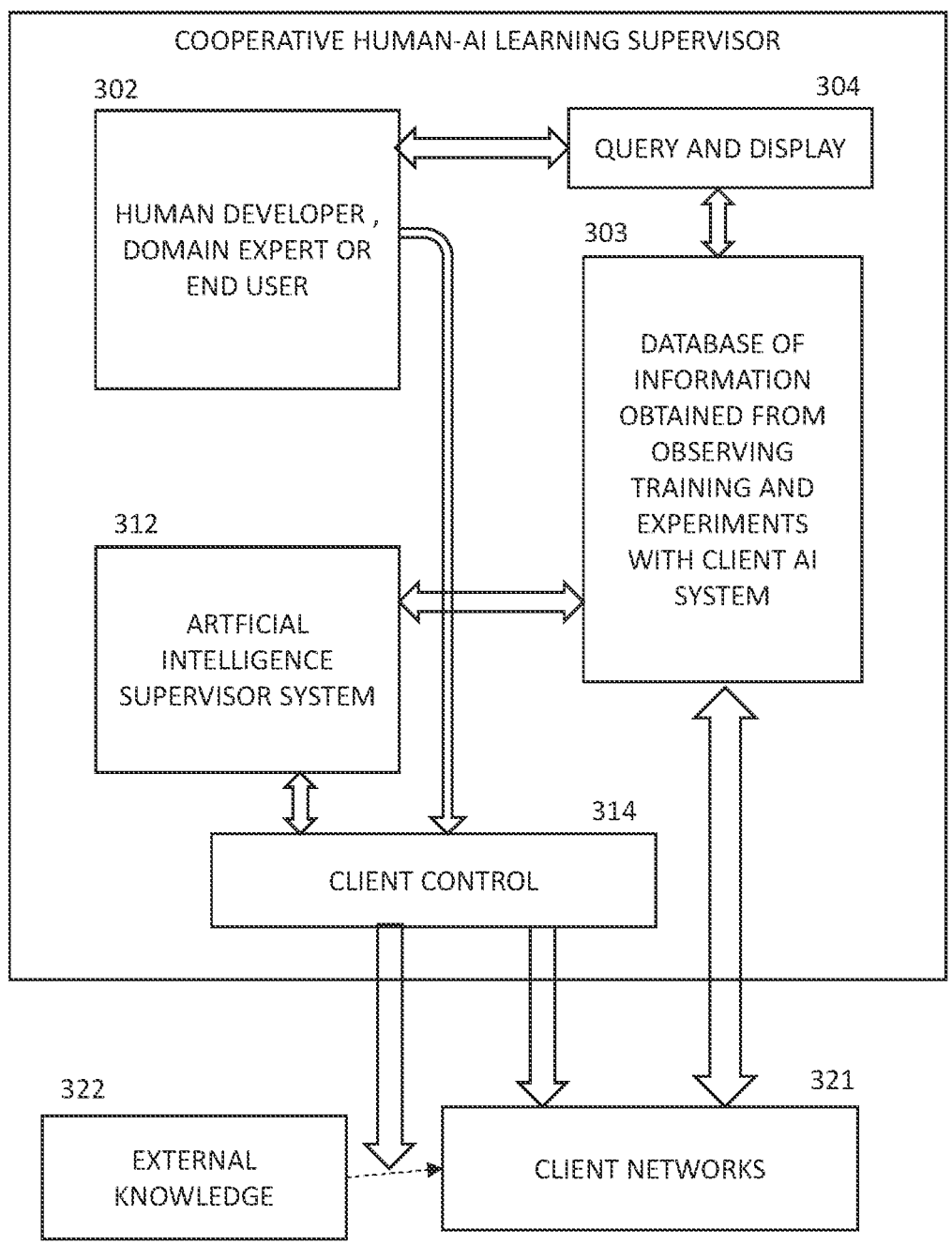
FIG. 3 is system diagram of a cooperative human-AI learning supervisor system and its client neural network systems according to various embodiments of the present invention.

FIG. 3 shows a more detailed diagram of an illustrative embodiment of the cooperative human-AI learning supervisor system 120, also shown in FIG. 1 and FIG. 2. In this embodiment, the cooperative human-AI learning supervisor system 120 comprises one or more human supervisors or assistants (302), who may be system developers, domain experts or end users. The cooperative human-AI learning supervisor system 120 further comprises a database 303 of information obtained from observing the training of and conducting experiments with client networks, such as the collection of neural networks (200, 206, . . . , 207) illustrated in FIG. 2. The learning supervisor system 120 further comprises a query and display system 304 by which the one or more human supervisors or assistants (302) may query the database 303 and view responses. The query and display system 304 may also enable the AI system 312 and the humans 302 to communicate and cooperate with each other. For example, the query and display system 304 may enable the humans 302 and the AI system 312 to cooperate in confirming and propagating interpretations as discussed in association with FIGS. 1 and 2. The query and display system 304 may also enable the humans 302 to control the client neural networks with the assistance of AI system 312, when that is more efficient or more effective than the humans controlling the clients directly.

The learning supervisor system 120 further comprises a client control and training system 314 (sometimes referred to herein simply as the "client control" or the "client control system"). The client control 314 executes the software instructions to train the client network 321 (e.g., including the network N shown in FIGS. 1 and 2), such as performing the forward and backward propagation calculations that can be part of training by stochastic gradient descent. In addition, through the client control 314, the one or more human supervisors or assistants 302 and the artificial intelligence supervisor system 312 may specify the design of the client networks 321, set hyperparameters and even dynamically control the hyperparameters during the training process for the client networks 321 implemented by the client control 314, and also to conduct experiments to determine the performance of the client networks 321 and variations thereto. The artificial intelligence supervisor system 312, the client control system 314, the database 303, the query and display system 304, and associated peripheral equipment, such as disk drives for database 303 and keyboard, mouse and display monitors, for the query and display system 304 may all be implemented in or controlled by software running on computer hardware such as the computer system 600 illustrated in FIG. 6. The client control system 314 also controls transfer of information between the database 303 and the client networks 321. The client control system 314 also controls the knowledge sharing links 323 between the external knowledge repository 322 and the neural networks 321. In some embodiments there may be multiple client networks being trained simultaneously.

Figure 4:
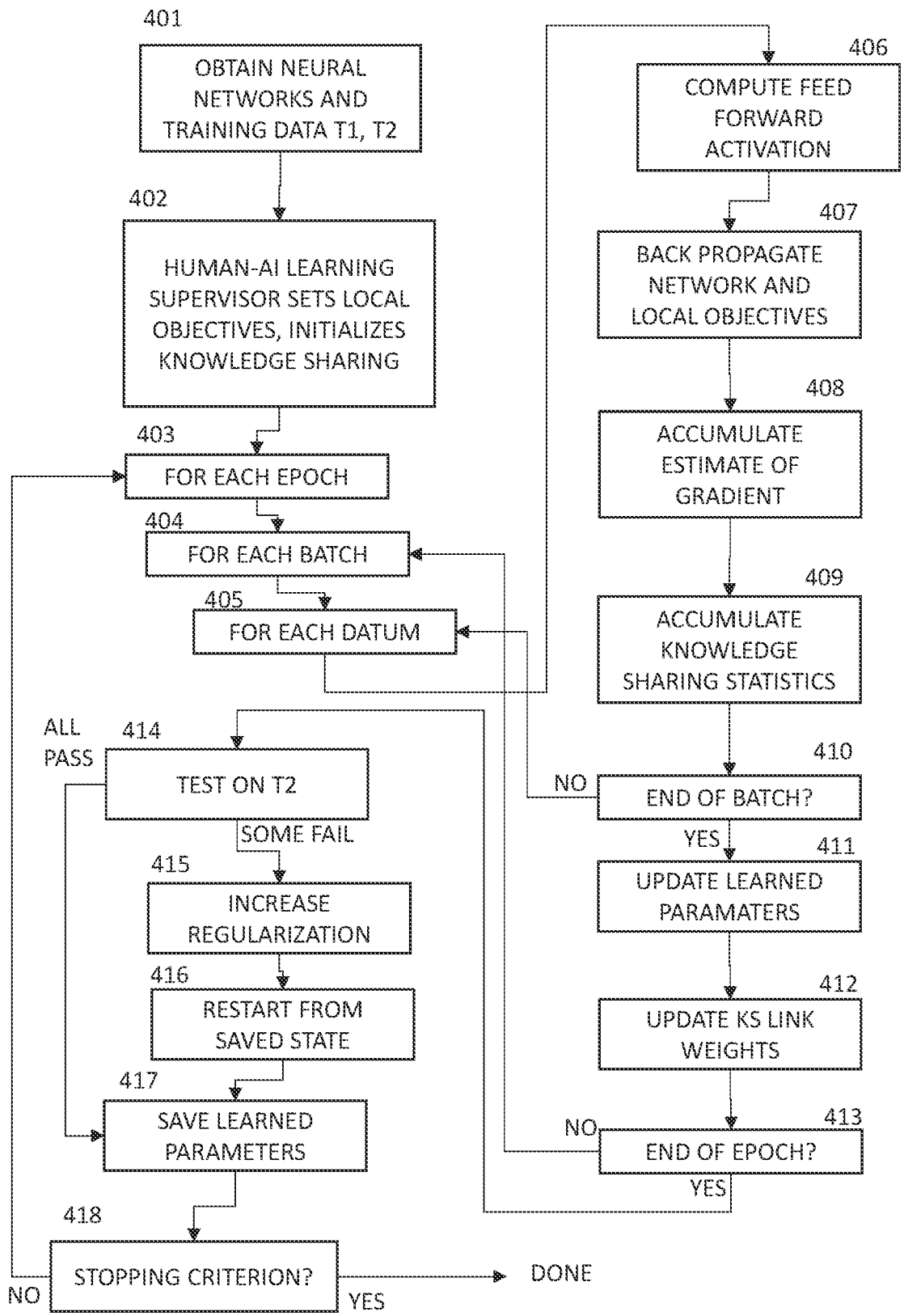
FIG. 4 is a flowchart of a process for training a system of one or more neural networks with associated knowledge sharing links according to various embodiments of the present invention.

FIG. 4 is a flowchart of an illustrative embodiment of training a neural network (e.g., the network N in FIG. 1) with associated data-dependent node-to-node knowledge sharing links. The design and training of the neural network and the associated data-dependent node-to-node knowledge sharing links are controlled by the cooperative human-AI learning supervisor system 120 (see FIGS. 1 and 2) in which the AI system 312 (see FIG. 3) in the learning supervisor system 120 and associated subsystems may be implemented on a computer system such as the computer system 600 illustrated in FIG. 6.

The illustrated process starts at block 401, where the learning supervisor system 120 obtains one or more neural networks (called the "client networks" in FIG. 3, which may include the network N and/or the networks 206, 207, etc. shown in FIG. 2) and a set of training data T, which the learning supervisor system 120 divides into two disjoint subsets T1 and T2. Additional labeled data T3 may be set aside for development testing. Additional data T4 disjoint from T1, T2 and T3 may be set aside for final validation testing.

In block 402, the human-AI learning supervisor system 120 creates one or more knowledge sharing links $<P_j, R_j>$, such as those shown in FIGS. 1 and 2. For each link $<P_j, R_j>$, the learning supervisor system 120 specifies a desired relationship between the activation of $P_j$ and the activation of $R_j$. The learning supervisor system 120 also specifies whether the output activation of each node is to be used or some other measure of the activation, as mentioned in the discussion of FIG. 1.

In block 402, the learning supervisor system 120 further specifies subsets $D1_j$ (and, optionally, $D2_j$) of T for which the relationship between the activations of $P_j$ and $R_j$ is to be enforced. In some embodiments, $D1_j$ and/or $D2_j$ may depend on the activation values of $P_j$ and $R_j$. In particular, whether a datum d is in $D1_j$ may depend on whether $act_{P_j}(d) \geq Th_{P_j}$ for a threshold $Th_{P_j}$ specified by the learning supervisor system and/or whether $act_{R_j}(d) \geq Th_{R_j}$ for a threshold $Th_{R_j}$ specified by the learning supervisor system.

After block 402, the learning supervisor system 120 proceeds to train the client neural networks obtained in block 401 and the associated knowledge sharing links. In an example embodiment, with the triple-nested loop from block 403 to block 418, the learning supervisor system 120 trains the neural network connections by stochastic gradient descent with minibatch updates and trains, and possibly modifies, the set of knowledge sharing links in blocks 407, 409 and 412. Training a neural network by stochastic gradient descent is well known to those skilled in the art of training neural networks.

In block 403, the learning supervisor system 120 initiates the processing of an epoch. In iterative training by stochastic gradient descent, one pass of the computation illustrated by blocks 404 to 417 for all the data in training set T1 is called an "epoch." The training set T1 may have thousands or even millions of elements. In stochastic gradient descent, T1 is broken into smaller sets called "minibatches." A typical size for a minibatch is 100 to 512 elements. In block 404, the learning supervisor system 120 initiates the processing of a new minibatch.

In block 405, the learning supervisor system 120 initiates the processing of a datum $d_t$ in T1. In block 406, the learning supervisor system 120 computes the activation values of the nodes in the networks for the datum $d_t$. This computation proceeds through the nodes of the neural networks in a feed forward process that is well known to those skilled in the art of neural networks.

In block 407, the learning supervisor system 120 performs a computation called "back propagation." Back propagation is a computation of the gradient of the error cost functions of the client networks' objectives and of the local objectives of the knowledge sharing links for which the knowledge receiving node is in one of the networks being trained.

The back-propagation computation proceeds backward through the client networks being trained and is well known to those skilled in the art of training neural networks. In this backwards computation, the learning supervisor system 120 computes the partial derivative of the sum of the error cost function of each network and of the local objectives with respect to each of the learned parameters of the network. The learned parameters typically comprise the connection weights and the node biases of the client networks.

Note, however, a pair of nodes in a knowledge sharing link are not required to be directly connected in the neural network. In some embodiments, each knowledge sharing link comprises a knowledge providing node P and a knowledge receiving node R that is always in a the same or a lower layer of the neural network than the knowledge providing node P and there may be a succession of such knowledge sharing links, as illustrated by the links, (P, R1), (R1, R2), (R2, R3) in FIG. 2. In some embodiments, in a layered client neural network, a knowledge providing node P may be linked to a knowledge receiving node R that is in the same or a higher layer. In some embodiments, there is a restriction that the knowledge providing node P should not be in the subnetwork that proceeds backwards from the receiving node R during the back-propagation computation. For example, the knowledge providing node P and the knowledge receiving node R may be in the same layer since, in a layered neural network, there are no connections between nodes in the same layer, so neither is in the subnetwork of the other. Thus, although nodes in the same layer cannot have a network connection, they may have a knowledge sharing link. In some embodiments, one or more pairs of nodes in the same layer may even have bilateral knowledge sharing links, comprising a knowledge sharing link in each direction. There is no restriction on the relative layers of a knowledge providing node P and a knowledge receiving node R when they are in separate networks. In some embodiments, there is no restriction on the relative layers of the nodes in a knowledge sharing link. In such embodiments, the knowledge sharing links may create a formal recursion in the back propagation computation, which may be handled either by an iterative computation or by merely approximating the recursion with a single backward computation.

In block 408, the learning supervisor system 120 adds the estimate of the partial derivative of the sum of the objectives with respect to each learned parameter for the current datum $d_t$ to an accumulated sum of such estimates summed over the previous data in the minibatch. Summed over the minibatch, this accumulation for a learned parameter is the stochastic estimate of one partial derivative in the stochastic estimate of the gradient of the sum of the error cost functions. This accumulation of estimated partial derivatives is well known to those skilled in the art of stochastic gradient descent.

In block 409, the learning supervisor system 120 accumulates statistics for training the weights of the knowledge sharing links. The training of the knowledge sharing weights may comprise stochastic gradient descent or other incremental estimates but is not limited to such incremental procedures. The learning supervisor system 120 may control the weights of the knowledge sharing links in an arbitrary fashion because the convergence of the learned parameters in the client neural networks does not depend on convergence of the weights of the knowledge sharing links. For example, the accumulation of incremental estimates of the weights may be done on an interval greater than a minibatch.

In some embodiments, the desired relationship between the activation value of a knowledge producing node P and a knowledge receiving node R may be represented based on a mapping of each activation function into a finite set of discrete values $k_P(d)=f_P(act_P(d))$, $k_R(d)=f_R(act_R(d))$, for example by using thresholds on the activation values such as described in association with block 402. In some embodiments, the weight of a knowledge sharing link between a knowledge providing node P and a knowledge receiving node R may represent an estimate of a conditional probability, of the form $Pr(k_P(d)=m|k_{R(d)}=n)$ or $Pr(k_R(d)=m|k_P(d)=n)$. In such an embodiment, the statistics accumulated by the learning supervisor system 120 in block 409 may be counts of each of the finite number of alternatives. In some embodiments, this accumulation may be over more data than the current minibatch, perhaps with some decaying weight for older data. Then the weight update to be performed in block 413 may be an estimate of the conditional probabilities subject to the constraint that mutually exclusive, exhaustive conditional probabilities must sum to one.

In block 410, the learning supervisor system 120 checks to see whether the datum $d_t$ that has just been processed is the end of a minibatch. If not, the learning supervisor system 120 returns to block 405 to get the next datum. If the datum $d_t$ is the end of a minibatch, the learning supervisor system proceeds to block 411.

In block 411, the learning supervisor system 120 updates each of the learned parameters of the client networks by subtracting from the current value of the learned parameter an increment computed by multiplying a learning rate hyperparameter R times the accumulated estimate of the partial derivative of the sum of the cost function with respect to the learned parameter, divided by the number of elements in the minibatch. In some embodiments, the learning rate parameter β may depend on the node. For example, there may be a separate learning rate parameter $β_R$ for the local objectives of each knowledge receiving node. Such an embodiment gives the learning supervisor system flexibility in controlling the degree of regularization created by the knowledge sharing links.

In block 412, the learning supervisor system 120 updates the weights of the knowledge sharing links. In some embodiments, the learning supervisor system 120 may also make other changes such as adding additional knowledge sharing links, deleting some existing knowledge sharing links or changing some of the hyperparameters associated with the training of the knowledge sharing links.

The weight for a knowledge sharing link is more like a customizable hyperparameter than a learned parameter (like the connection weights and node biases in a neural network). In some embodiments a link weight may be set to a fixed constant and not trained at all. In some embodiments, all link weights are subject to "weight decay." That is, at each update the magnitude of a weight |w| of a knowledge sharing in link may be multiplied by (1−λ), based on the L2 norm, or may be reduced to |w|−δ, based on the L1 norm, for values of the constants X and δ that are specified by the learning supervisor system 120. In some embodiments, a knowledge sharing link may be deleted by the learning supervisor system 120 if its weight converges to zero. Such a deletion is called "pruning." In some embodiments, this pruning mechanism enables the learning supervisor system 120 to teach the client networks new interpretations or even to discover new interpretations that are not predetermined by the learning supervisor system. FIG. 5 illustrates an example of such a process of learning an interpretation that is not predetermined.

In some embodiments, the activation function of a knowledge providing node P and a knowledge receiving node R may each be mapped into a discrete set of values and the weight for the link between P and R may depend on the pair of discrete values. In some embodiments, the weights dependent on the pairs of discrete values may represent conditional probability distributions.

As mentioned in the discussion of block 409, the accumulated statistics computed in block 409 may comprise counts of discrete events. Thus, in some embodiments, in block 412, the learning supervisor system 120 may estimate conditional probabilities from the counts to update the weights.

In some embodiments, each node R that is a knowledge receiving node may be associated with a hyperparameter $β_R$ that operates as a learning rate hyperparameter for the local objective associated with knowledge receiving node R.

In some versions of such an embodiment, the sum of the magnitude of the weights for all the links for which R is a knowledge receiving node may be constrained to sum to one, for example if the intended model for the links is that the set of knowledge providing nodes are competing to influence knowledge receiving node R and the weight of each of the links is the estimate of the probability that the knowledge providing node for that link is the one influencing R for the current datum In some embodiments, the learning supervisor system 120 may adjust the relative values of the weights of the links for which R is a knowledge receiving node. A special case of such an embodiment is discussed in association with FIG. 5. The aspect of the invention illustrated in FIG. 5 may enable the learning supervisor system 120 to train a node to discover an interpretation without the desired interpretation being predetermined by either the humans (302) or the AI system (312) in the learning supervisor system 120. The decision to set up a special case such as the one illustrated in FIG. 5 is a decision that may be made jointly by humans and the AI system (312) in the learning supervisor system 120. Either the humans (302) or the AI system (312) in the learning supervisor system may initiate the cooperative decision.

In some embodiments, the learning supervisor system 120 may take action if the desired relationship between the activation values is failing to be realized. In some embodiments, the action may be to reduce the magnitude of the weight of a link from a knowledge providing node P to knowledge receiving node R. In some embodiments, the action may be to change the set of data $D1_j$ or $D2_j$ over which the relationship for the link $<P_j, R_j>$ is to be enforced. In some cases, elements may be removed from $D1_j$, for example if the relationship is failing on some elements of $D1_j$ but is satisfied on others. In some cases, elements may be added to the set $D1_j$ as an alternative to increasing the weight of link $<P_j,R_j>$, for example if the learning supervisor system 120 determines that more broadly enforcing the objective of the link is likely to lead to better performance. In some cases, the decision of which actions to take may be made by the AI system (312) in the learning supervisor system 120. In some cases, the decision may be made jointly by the humans (302) and the AI system (312) in the learning supervisor system 120. In some cases the decision may be made by the humans (302) with the assistance of the AI system (312) in the learning supervisor system 120.

In some embodiments, the learning supervisor system 120 may choose to make changes in a link weight, the set $D1_j$ or $D2_j$ or the local learning rate parameter $\beta_R$ based on performance tests on data set T2. In some embodiments, the learning supervisor system 120 may use reinforcement learning to explore various combinations of changes in the hyperparameters that control the knowledge sharing links, including the selection of node pairs to be linked and the specified desired relationships. These decisions also may be made by cooperation between the humans (302) and the AI system (312) in the learning supervisor system 120.

As the examples show, the weights of the knowledge sharing links are not tied to the gradient descent process that updates the connection weights of the networks. The learning supervisor system 120 may adjust the weights of the knowledge sharing links in any way that suits the current application and whatever strategy the cooperative human-AI learning supervisor is implementing.

For example, in the situation in which knowledge sharing links are added to avoid or reduce overfitting, the learning supervisor system 120 may adopt a simple strategy of leaving the link weights constant and increasing the degree of regularization by increasing the hyperparameters $\beta_R$ controlling the learning rates for the local objectives of each knowledge receiving node R. In block 413, the learning supervisor system 120 tests whether the current datum is the end of an epoch. If not, the learning supervisor system 120 returns of block 404 to start another minibatch. If so, the learning supervisor system 120 proceeds to block 414.

In some embodiments, the learning supervisor system 120 implements an alternative to early stopping in blocks 414-417. Early stopping is an action, well known to those skilled in the art of training neural networks by iterative gradient descent, in which the iterative training is stopped prematurely. Although stopping the training prematurely may reduce overfitting, it has the side effect that the training process does not proceed to convergence. For example, some parts of the client network may not yet have converged close to their optimum values.

In blocks 414-417, the learning supervisor system 120 may use the local objectives of knowledge sharing links to reduce overfitting without having to halt the iterative training process. The local objectives from knowledge sharing links not only enhance interpretability, they increase regularization and thereby reduce the effective number of degrees of freedom of the client neural networks. Another advantage of data-dependent node-to-node knowledge sharing links is that the regularization is specific to an individual knowledge receiving node. Data-dependent node-to-node knowledge sharing links can be applied just to the parts of a network that need them, whereas early stopping stops the training process for the whole network.

In a neural network training system that may modify the initial neural network, errors that are made on the training data may be reduced by adding additional nodes and connections. However, this process of adding connections increases the number of degrees of freedom and may cause overfitting and thereby extra errors on data that is not in the set of training data. Adding additional data-dependent node-to-node knowledge sharing links, on the other hand, may reduce the number of errors on new data since it enhances the ability of the knowledge receiving nodes to learn knowledge that is helpful in the classification task of the network while reducing the effective number of degrees of freedom. The decision of whether to add additional knowledge sharing links, how many to add and where to put them may be made cooperatively by the humans (302) and the AI system (312) in the learning supervisor system 120. The AI system (312) in the learning supervisor system 120 may detect the need for such an increase in the number of knowledge sharing links, for example, by the tests in block 414. A human (302) may initiate the action by noticing the need from monitoring the performance of the client networks through the query and display system (304 in FIG. 3).

By helping a knowledge receiving node learn an interpretable concept, a knowledge sharing link helps the knowledge receiving node learn a concept that is important enough in the real world to have a name. This property may further help the network learn concepts that will generalize to new data that is not contained in the set of training data.

In block 414, the learning supervisor system 120 tests the performance of the output of each of the client networks on its network objective. In some embodiments, the learning supervisor system 120 also tests the performance of selected nodes with a confirmed or tentative interpretation on matching its interpretation. In some embodiments, these performance tests may be performed on a set of data comprising data from T2.

Applying such a test on the client network objective may be used as a criterion for early stopping, that is, halting the training process prematurely. For example, the training may be halted if the performance fails a test, for example, if the performance on the data sample from T2 is worse than the performance measured at the end of previous epochs by more than some amount specified by a hyperparameter. Such a test for early stopping is well known to those skilled in the art of training neural networks. However, blocks 414-417 may implement an alternative to early stopping instead.

In block 414, if the performance of the output of a client network and the performance of all the selected interpreted nodes is no worse than previous performance by more than the specified amount, then the network and the interpretations are said to have passed the tests for the current epoch and the learning supervisor system proceeds to block 417.

If the performance of the network or of any of the selected interpreted nodes fails to meet the criterion, then the learning supervisor system 120 proceeds to block 415.

In block 415, the learning supervisor system 120 may increase the degree of regularization in any of the ways described above, with the humans (302) and the AI system (312) in the learning supervisor 120 working cooperatively. The learning supervisor system 120 may increase the learning rate $\beta_R$ for the local objectives and/or the weight of links to selected knowledge receiving nodes. In particular, the learning supervisor system 120 may increase the learning rate and/or the weights of links to a knowledge receiving node that is in the subnetwork of any of the selected interpreted nodes that failed a test in block 414. The learning supervisor system 120 may also increase the number of knowledge sharing links to increase the amount of regularization.

In block 416, the learning supervisor system 120 optionally restarts the training process from a snapshot of the learned parameters saved in block 417 after a previous epoch. In some embodiments, the learning supervisor 120 may set the criterion for the test in block 414 such that the test fails well before a normal test for early stopping. Then the learning supervisor 120 may continually adjust the regularization so that restarting from an earlier saved state may be optional.

In block 417, the learning supervisor system 120 saves the learned parameters and any other data needed to restart the training process in block 416 if a network fails the test in block 414 after a future epoch.

In block 418, the learning supervisor system 120 tests a criterion for stopping the iterative training process. This criterion may be that magnitude of the gradients of the cost functions are small and that the performance appears to have reached a steady state value other than the random fluctuations caused by stochastic estimation of the gradient.

FIG. 5 is a flowchart of a special case of adjusting the relative weights of a set of knowledge sharing links that share the same knowledge receiving node R. The procedure in the flowchart in FIG. 5 is an example of a method by which a node may discover a relationship rather than the relationship being predetermined by the learning supervisor system 120. The procedure shown in FIG. 5 may be used when the knowledge receiving node R is the knowledge receiving node for a set of mutually exclusive nodes or a set of nodes with mutually exclusive interpretations. For example, in a classifier with mutually exclusive categories, any subset of the output nodes would be a set of nodes with mutually exclusive interpretations. Any set of nodes with known interpretations in a softmax set would also be such a set. In some embodiments, a weaker condition may be applied to the set of knowledge providing nodes. In these embodiments, the set of knowledge providing nodes may comprise a knowledge providing node P for which there is a tentative interpretation, rather than a known interpretation. For example, the interpretation of the node P may be the hoped-for consequence of a specified desired relationship in which the node P is a knowledge receiving node before the specified relationship has finished being successfully trained.

The illustrated process starts at block 501, where the learning supervisor system 120 obtains a neural network (e.g., the neural network N and/or networks 206, 207, etc. in FIG. 2) and disjoint sets of training data T1 and T2. In block 502, the learning supervisor system 120 selects a set MM of mutually exclusive nodes or a set of nodes with mutually exclusive interpretation. In some embodiments, the elements of MM are required to have known interpretations. In some embodiments, the elements of MM are not required to have known interpretations.

In block 503, the learning supervisor system 120 selects a set RR of one or more nodes R, each designated to learn a relationship with an unspecified subset $Q_R$ of MM. The selection of the set MM in block 502 and the selection of the set RR may be done cooperatively by the humans (302) and the AI system (312) in the learning supervisor system 120 or by either a human or the AI system (312) working alone. Determining the set $Q_R$ may be done automatically without being predetermined by either the humans (302) or the AI system (312) in the learning supervisor system.

In some embodiments, the set RR may contain a single element. In some embodiments, the process illustrated in FIG. 5 is performed multiple times with different sets $RR_n$.

The intent of the training process of the knowledge sharing links to each of the knowledge receiving nodes R is to select a subset $Q_R$ and to discover relationships with the members of the subset $Q_R$ whereby the set $Q_R$ characterizes the discovered interpretation of R. The selection of a subset $Q_R$ of MM is done through a process of pruning some of the links from the elements of MM to the knowledge receiving node R. An example embodiment of a process for pruning links is described in association with block 509.

In the illustrative embodiment, in block 504, the learning supervisor system 120 sets thresholds for Boolean variables associated with knowledge receiving node R and for the nodes in MM. These thresholds and Boolean variables may be implemented as described in association with FIG. 1.

In block 505, the learning supervisor system 120 creates a knowledge sharing link for each pair comprising a node P in MM and a node R in the set RR. In block 506, the learning supervisor system 120 sets a local objective for each link. In some embodiments the local objectives are in the form $act_R(d) \geq act_P(d)$, for R in RR and P in MM. In some embodiments, the relationship is based on the Boolean variables defined in block 504 and have the form $V_R(d) \geq V_P(d)$, where $V_R$ and $V_P$ are the Boolean variables defined in block 504. This relationship also corresponds to the relationship that the node R should have an activation above threshold for a superset of the data for which the node P has an activation above threshold. Because the elements in MM are mutually exclusive or have mutually exclusive interpretations, a knowledge receiving node that is learning an interpretation that corresponds to a subset $Q_R$ of MM should be activated for a superset of the set for which any one member of the set $Q_R$ is activated.

In block 507, the learning supervisor system 120 sets initial weights for the knowledge sharing links between the nodes in MM and the nodes in RR. In an example embodiment, the learning supervisor system 120 initially sets all the link weights equal to 1 divided by the number of elements in M. In another example embodiment, the learning supervisor system 120 sets random values for the link weights subject to the condition that the link weights are non-negative and the sum of the link weights for all the links to a node R is 1.

In block 508, the learning supervisor system 120 performs training of the neural network N and the associated knowledge sharing links for a specified number of iterations of the loop from 403 to 417 in FIG. 4. In an example embodiment, in block 412 of FIG. 4, the learning supervisor system 120 may update the knowledge sharing links for links from MM to RR subject to the constraint that the link weights are non-negative and the sum of the link weights for all the links to a node R is 1. The learning supervisor system 120 may select the number of iterations of the loop from 403 to 417 to provide enough change in the link weights to test whether some of the links should be pruned.

In block 509, the learning supervisor system 120 checks the knowledge sharing links from MM to RR. The learning supervisor system 120 may prune some of the links. The pruning may be done by the learning supervisor system 120 by using weight decay and pruning links with weights that decay to less than a magnitude set by a hyperparameter. In some embodiments, weight decay may be optional, since the constraint that the weights sum to one may naturally cause the normal training process to maximize the weights of some of the links while driving the weights of the rest of the links toward zero.

In some embodiments, the learning supervisor system 120 may prune a link based on implementing two versions of a client network, one with the link and one without the link. The learning supervisor system 120 may then choose whether to prune the link based on a comparison of the relative performance. In some embodiments, the learning supervisor system 120 may test a plurality of links in a single comparative performance test. For example, the learning supervisor system 120 may create several systems each with a random subset of the links being tested. Then the learning supervisor system 120 may estimate a regression fit to the performance as a function of which links are included.

In block 509, the learning supervisor system 120 may also change some thresholds and may change some local objectives and some hyperparameters.

In block 510, the learning supervisor system 120 tests a stopping criterion. The stopping judgment in block 510 is not whether the training of the neural network is complete. The stopping judgment is merely that the learning supervisor system 120 determines to do no further discovery of or additional training of relationships between subsets of MM and nodes in RR. For example, the learning supervisor system 120 may determine to stop the process of FIG. 5 if there has been no additional pruning of links for some number of testing intervals. If the stopping criterion is not met, the learning supervisor system 120 returns to block 508, otherwise the learning supervisor system 120 returns to normal training of the neural network and associated knowledge sharing links as illustrated in FIG. 4.

During the resumed training in FIG. 4, the learning supervisor system 120 may return to the process illustrated in FIG. 5, either after enough additional normal training potentially to change the relationships and interpretations, or sooner, perhaps immediately, with a different selection for the set MM and/or for the set RR.

FIG. 6 is a diagram of a computer system 600 that could be used to implement the embodiments described above and in association with other figures. The illustrated computer system 600 comprises multiple processor units 602A-B that each comprises, in the illustrated embodiment, multiple (N) sets of processor cores 604A-N. Each processor unit 602A-B may comprise on-board memory (ROM or RAM) (not shown) and off-board memory 606A. The on-board memory may comprise primary, volatile and/or non-volatile, storage (e.g., storage directly accessible by the processor cores 604A-N). The off-board memory 606A-B may comprise secondary, non-volatile storage (e.g., storage that is not directly accessible by the processor cores 604A-N), such as ROM, HDDs, SSD, flash, etc. The processor cores 604A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 610 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 604 may train and/or implement different networks or subnetworks or components. For example, the processor cores 604 could implement the computer-implemented aspects of the learning supervisor system 120 described herein. For example, in one embodiment, the cores of the first processor unit 602A may implement the artificial intelligence supervisor system 312 in FIG. 3, the second processor unit 602B may implement the client control 314, a third processor unit may implement (e.g., training and operational phases) the client networks 321, and the host processor 610 may implement the external knowledge repository 322, the database system 303 and the query and display module 304. As another example, another multiple processor unit (not shown) may implement the external knowledge repository 322. Further, different sets of cores in the first and/or second processor units 602A, 602B may be responsible for parallel processing threads for different machine learning modules in the FIG. 3. One or more host processors 610 may coordinate and control the processor units 602A-B.

In other embodiments, the computer system 600 could be implemented with one processor unit. In embodiments where there are multiple processor units, the processor units could be co-located or distributed. For example, the processor units may be interconnected by data networks, such as a LAN, WAN, the Internet, etc., using suitable wired and/or wireless data communication links. Data may be shared between the various processing units using suitable data links, such as data buses (preferably high-speed data buses) or network links (e.g., Ethernet).

The software for the various computer systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, CUDA, Fortran, Java, Lisp, Pascal, Object Pascal, Haskell, ML; and examples of scripting languages include Bourne script, JavaScript, Python, Ruby, Lua, PUP, and Perl.

In one general aspect, therefore, embodiments of the present invention are directed to computer-implemented methods and computer systems for training a neural network N. The neural network N comprises a plurality of layers, that comprise an input layer, an output layer, and zero or more middle layers that are between the input layer and the output layer, such that the input layer is the lowest layer of the neural network N and the output layer is the highest layer of the neural network N. Each of the plurality of layers comprises one or more nodes, such that one of the plurality of layers comprises a node R. The neural network comprises a plurality of directed arcs, where each of the directed arcs goes from a source node in a lower layer of the neural network N to a destination node in a higher layer of the network. The node R is a destination node for at least one of the plurality of directed arcs.

The method comprises training, by a machine-learning computer system, the neural network N to achieve a global objective for the neural network N, where the node R has a first knowledge-sharing link from a first knowledge sharing source P to the node R. Training the neural network N comprises imposing, by the cooperative human-AI learning supervisor system, a local objective in the training of the neural network N that regularizes the node R for a specified relationship between an output of a first mathematical function applied to inputs of node R on each datum in a training data set D1 and an output of a second mathematical function applied to inputs of a first knowledge-providing node P on each datum in the training set D1, such that the node R is trained to jointly satisfy the global and local objectives. The specified relationship could be that the outputs of the first and second mathematical functions are equal on the training data set D1, although other relationships could be used.

The computer system, in various embodiments, comprises one or more processor cores and computer memory that is in communication with the one or more processor cores, where the computer memory stores software that when executed by the one or more processor cores, causes the one or more processor cores to train the neural network N according to this method. In another embodiment, the computer system comprises a first set of one or more processor cores that are programmed to train the neural network N to achieve a global objective for the neural network N, and a second set of one or more processor cores that are programmed to select a first knowledge-sharing link for the node R from a knowledge-providing node P. The first set of one or more processors imposes a local objective in the training of the neural network N that regularizes the node R for a specified relationship between an output of a first mathematical function applied to inputs of node R on each datum in a training data set D1 and an output of a second mathematical function applied to inputs of a first knowledge-providing node P on each datum in the training set D1, such that the node R is trained to jointly satisfy the global and local objectives. In various implementations, the machine-learning computer system additionally selects the first knowledge-sharing link. Also, the machine-learning computer system may additionally impose a parameter that specifies a relative weight for the first knowledge-sharing link relative to the second knowledge-sharing link. In addition, the machine-learning computer system may additionally impose a revised training hyperparameter in the training of the neural network N.

In various implementations, the machine-learning computer system comprises a cooperative human-AI learning supervisor system. In such an implementation, the step of selecting the first knowledge-sharing link may comprise cooperatively selecting, by one or more humans and an AI system of the cooperative human-AI learning supervisor system, the first knowledge-sharing link. The first knowledge-sharing link may be cooperatively selected based on whether an activation pattern for the first knowledge-providing node P is interpretable by the one or more humans.

In various implementations, the first mathematical function is an activation function for the node R and the second mathematical function is an activation function for the node P. The first and second mathematical functions could be the same. The first and second mathematical functions could also be softmax functions for the nodes R and P, respectively. Also, the first and second mathematical functions could weighted sum of inputs for the nodes R and P, respectively.

In various implementations, a training data set T is available to train the neural network N. In such a case, the training data set D1 may be a subset of the training data set T and the machine-learning computer system determines the data in the training data set T that are to be used for the training data set D1.

In various implementations, the neural network N is trained through stochastic gradient descent.

In various implementations, the knowledge-providing node P is a node in the neural network N. For example, the knowledge-providing node P could be on the same layer of the neural network N as the node R. In that case, the method could further comprise the step of imposing a second local objective by the machine-learning computer system in the training of the neural network N, such that the second local objective regularizes the node P for a second specified relationship between an output of a third mathematical function applied to inputs of node P on each datum in a training data set D2 and an output of a fourth mathematical function applied to the inputs of the node R on each datum in the training set D2, such that the node P is trained to jointly satisfy the global and second local objectives. The first and fourth mathematical functions could be the same or different. And they could be the same as the first and second mathematic functions. The knowledge-providing node P commonly is in a higher layer of the neural network N than the node R or a node in an external neural network that is not the neural network N (such that the external neural network is not trained with the neural network N).

In various embodiments, the node R may have a second knowledge-sharing link from a second knowledge sharing node P2. Both knowledge-sharing nodes P and P2 could be nodes in the neural network N or they could be nodes in different networks (e.g., network N and an external network, or two external networks). In an embodiment having two (or more) knowledge-providing nodes P and P2 for the node R, the step of training the neural network N may further comprise imposing a second local objective during the training of the neural network N that regularizes the node R for a second specified relationship between an output of a third mathematical function applied to the inputs of node R on each datum in a training data set D2 and an output of a fourth mathematical function applied to inputs of the second knowledge-providing node P2 on each datum in the training set D2, such that the node R is trained to jointly satisfy the global, local and second local objectives. The first and fourth mathematical functions could be the same or different. And they could be the same as the first and second mathematical functions. Also, the training data set D1 may be disjoint from the second training data set D2.

In various implementations, the knowledge-providing node P has a known interpretation. In that case the specified relationship may be that the interpretations of nodes P and R are equal on the training data set D1. The known interpretation of the knowledge-providing node P could be an output category of a machine learning classifier.

In various implementations, the specified relationship is a relationship between a first Boolean variable and a second Boolean variable. The first Boolean variable may be dependent on whether the output of the first mathematical function for the node P is equal or greater than a threshold value for the node P and the second Boolean variable may be dependent on whether the output of the first mathematical function for the node R is equal or greater than a threshold value for the node R.

In such an implementation, the specified relationship may be a first relationship between a first Boolean variable and a second Boolean variable; the second specified relationship is a second relationship between a third Boolean variable and a fourth Boolean variable, where the first relationship is different from the second relationship. Also, the first Boolean variable may be dependent on whether the output of the first mathematical function for the node P is equal or greater than a threshold value for node P; the second Boolean variable may be dependent on whether the output of the first mathematical function for node R is equal or greater than a threshold value for node R; and the third Boolean variable may be dependent on whether the output of the second mathematical function for the node P2 is equal or greater than a threshold value for node P2; and the fourth Boolean variable may be dependent on whether the output of the second mathematical function for the node R is equal or greater than a threshold value for the node R. The first, second, third and fourth mathematical functions may be the same or different. They could also be activation functions.

In various implementations, the cooperative human-AI learning supervisor system comprises: an AI supervisor system; a database that stores information from observing training of and/or conduction of experiments on one or more neural networks; a search query interface for a human to issue a query to the database and view results from the query; and a client control system that trains the neural network N.

In various implementations, the neural network N comprises a node R1 that is on a layer of the neural network that is not higher than the layer of node R. In that case, the step of training the neural network N may further comprise, imposing the local objective, imposing a second local objective by the machine-learning computer system in the training of the neural network N, where the second local objective regularizes the node R1 for a second specified relationship between an output of a third mathematical function applied to inputs of node R1 on each datum in a training data set D2 and an output of a fourth mathematical function applied to the inputs of the node R on each datum in the training set D2, such that the node R1 is trained to jointly satisfy the global and second local objectives.

The neural network N may also comprise a node R2 that is on a layer of the neural network that is not higher than the layer of node R1. In that case, training the neural network N may further comprise, imposing the second local objective, imposing a third local objective by the machine-learning computer system in the training of the neural network N, wherein the third local objective regularizes the node R2 for a third specified relationship between an output of a fifth mathematical function applied to inputs of node R2 on each datum in a training data set D3 and an output of a sixth mathematical function applied to the inputs of the node R1 on each datum in the training set D3, such that the node R2 is trained to jointly satisfy the global and third local objectives. The first, second and third specified relationships could be the same or different. The first through sixth mathematical functions could be the same or different.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method for training a neural network N, wherein:
   the neural network N comprises a plurality of layers:
   the plurality of layers comprise an input layer, an output layer, and zero or more middle layers that are between the input layer and the output layer;
   each of the plurality of layers comprises one or more nodes, such that the neural network N comprises at least a node R,
   the method comprising:
   training, by a machine-learning computer system, the neural network N to achieve a global objective for the neural network N, wherein the node R has a first unidirectional knowledge sharing link from a first knowledge sharing source P to the node R, wherein training the neural network N comprises training the neural network N with a set of training data D1 such that the node R is trained with at least two objectives for the set of training data D1, the two objectives comprising:
   the global objective for the neural network N; and
   a local objective that regularizes node R to better satisfy a specified relationship between, for each datum d in the set of training data D1, (i) an output value of a first mathematical function applied to inputs of node R for the datum d and (ii) an output value of a second mathematical function applied to inputs of the first knowledge sharing source P for the datum d.

2. The method of claim 1, wherein the first knowledge sharing source P comprises a node of the neural network N.

3. The method of claim 1, wherein the first knowledge sharing source P comprises a node of a neural network that is different from the neural network N.

4. The method of claim 1, wherein training the neural network N further comprises selecting, by the machine-learning computer system, the node R prior to training the neural network N with the set of training data D1.

5. The method of claim 4, wherein:
   the machine-learning computer system comprises a cooperative human-AI learning supervisor system; and
   the step of selecting the node R comprises cooperatively selecting, by one or more humans and an AI system of the cooperative human-AI learning supervisor system, the node R.

6. The method of claim 1, wherein:
   the first mathematical function is an activation function for the node R; and
   the second mathematical function is an activation function for the first knowledge sharing source P.

7. The method of claim 6, wherein the activation function for the node R is the same as the activation function for the first knowledge sharing source P.

8. The method of claim 1, wherein:
the first mathematical function is a softmax function for the node R; and
the second mathematical function is a softmax function for the first knowledge sharing source P.

9. The method of claim 1, wherein:
a training data set T is available to train the neural network N;
the training data set D1 is a subset of the training data set T; and
the method further comprises determining, by the machine-learning computer system, data in the training data set T that are to be used for the training data set D1.

10. The method of claim 1, wherein training the neural network N comprises training the neural network N through stochastic gradient descent.

11. The method of claim 1, wherein:
the node R has a second unidirectional knowledge sharing link from a second knowledge sharing source P2 to the node R; and
training the neural network N further comprises further comprises the training of the neural network N with a second set of training data D2 such that:
the node R is trained with at least two objectives for the set of training data D2, the two objectives comprising:
the global objective for the neural network N; and
a second local objective that regularizes node R to better satisfy a second specified relationship between, for each datum d2 in the second set of training data D2, (i) an output value a third mathematical function applied to inputs of node R on each datum d2 in the second set of training data D2 and (ii) an output value of a fourth mathematical function applied to inputs of the second knowledge sharing source P2 on each datum d2 in the second set of training data D2.

12. The method of claim 11, wherein the set of training data D1 is disjoint from the second set of training data D2.

13. The method of claim 11, wherein:
the specified relationship is a first relationship between a first Boolean variable and a second Boolean variable;
the second specified relationship is a second relationship between a third Boolean variable and a fourth Boolean variable, wherein the first relationship is different from the second relationship;
the first Boolean variable is dependent on whether the output value of the first mathematical function for the node R is equal or greater than a threshold value for node R;
the second Boolean variable is dependent on whether the output value of the second mathematical function for the first knowledge sharing source P is equal or greater than a threshold value for the first knowledge sharing source P;
the third Boolean variable is dependent on whether the output value of the third mathematical function for the node R is equal or greater than a threshold value for node R; and
the fourth Boolean variable is dependent on whether the output value of the fourth mathematical function for the second knowledge sharing source P2 is equal or greater than a threshold value for the second knowledge sharing source P2.

14. The method of claim 13, wherein the first, second, third and fourth mathematical functions are activation functions.

15. The method of claim 11, wherein:
a training data set T is available to train the neural network N;
the set of training data D1 is a subset of the training data set T;
the second set of training data D2 is a subset of the training data set T; and
the method further comprises determining, by the machine-learning computer system:
data in the training data set T that are to be used for the set of training data D1; and
data in the training data set T that are to be used for the second set of training data D2.

16. The method of claim 1, wherein the specified relationship is that outputs of the first and second mathematical functions are equal on the training data set D1.

17. The method of claim 1, wherein:
the first knowledge sharing source P has a known interpretation; and
the specified relationship is that the known interpretation of the first knowledge sharing source P equals an interpretation for node R on the training data set D1.

18. The method of claim 17, wherein the known interpretation of the first knowledge sharing source P is an output category of a classifier.

19. The method of claim 1, wherein:
the specified relationship is a relationship between a first Boolean variable and a second Boolean variable;
the first Boolean variable is dependent on whether the output value of the first mathematical function for the node R is equal or greater than a threshold value for the node R; and
the second Boolean variable is dependent on whether the output value of the second mathematical function for the first knowledge sharing source P is equal or greater than a threshold value for the first knowledge sharing source P.

20. A computer system for training a neural network N, wherein:
the neural network N comprises a plurality of layers:
the plurality of layers comprise an input layer, an output layer, and zero or more middle layers that are between the input layer and the output layer; each of the plurality of layers comprises one or more nodes, such that the neural network N comprises at least a node R, the computer system comprising:
one or more processor cores; and
computer memory that is in communication with the one or more processor cores, wherein the computer memory stores software that when executed by the one or more processor cores, causes the one or more processor cores to train the neural network N through machine learning to achieve a global objective for the neural network N and such that the node R has a first unidirectional knowledge sharing link from a first knowledge sharing source P to the node R, such that, for a set of training data D1, the node R is trained with at least two objectives for the set of training data D1, the two objectives comprising:
the global objective for the neural network N; and
a local objective that regularizes node R to better satisfy a specified relationship between, for each datum d in the set of training data D1, (i) an output value of a first mathematical function applied to inputs of node R for the datum d and (ii) an output value of a second mathematical function applied to inputs of the first knowledge sharing source P for the datum d.

21. The computer system of claim 20, wherein the first knowledge sharing source P comprises a node of the neural network N.

22. The computer system of claim 20, wherein the first knowledge sharing source P comprises a node of a neural network that is different from the neural network N.

23. The computer system of claim 20, wherein the computer memory further stores software that, when executed by the one or more processors cores, causes the one or more processor cores to train the neural network N further by selecting the node R prior to training the neural network N with the set of training data D1.

24. The computer system of claim 20, wherein:
the first mathematical function is an activation function for the node R; and
the second mathematical function is an activation function for the first knowledge sharing source P.

25. The computer system of claim 24, wherein the activation function for the node R is the same as the activation function for the first knowledge sharing source P.

26. The computer system of claim 20, wherein:
the first mathematical function is a softmax function for the node R; and
the second mathematical function is a softmax function for the first knowledge sharing source P.

27. The computer system of claim 20, wherein:
a training data set T is available to train the neural network N;
the training data set D1 is a subset of the training data set T; and
the computer memory further stores software that, when executed by the one or more processors cores, causes the one or more processor cores to determine data in the training data set T that are to be used for the training data set D1.

28. The computer system of claim 20, wherein the computer memory further stores software that, when executed by the one or more processors cores, causes the one or more processor cores to train the neural network N through stochastic gradient descent.

29. The computer system of claim 20, wherein:
the node R has a second unidirectional knowledge sharing link from a second knowledge sharing source P2 to the node R; and
the computer memory further stores software that, when executed by the one or more processors cores, causes the one or more processor cores to train the neural network N with a second set of training data D2 such that:
the node R is trained with at least two objectives for the set of training data D2, the two objectives comprising:
the global objective for the neural network N; and
a second local objective that regularizes node R to better satisfy a second specified relationship between, for each datum d2 in the second set of training data D2, (i) an output value a third mathematical function applied to inputs of node R on each datum d2 in the second set of training data D2 and (ii) an output value of a fourth mathematical function applied to inputs of the second knowledge sharing source P2 on each datum d2 in the second set of training data D2.

30. The computer system of claim 29, wherein the set of training data D1 is disjoint from the second set of training data D2.

31. The computer system of claim 29, wherein:
the specified relationship is a first relationship between a first Boolean variable and a second Boolean variable;
the second specified relationship is a second relationship between a third Boolean variable and a fourth Boolean variable, wherein the first relationship is different from the second relationship;
the first Boolean variable is dependent on whether the output value of the first mathematical function for the node R is equal or greater than a threshold value for node R;
the second Boolean variable is dependent on whether the output value of the second mathematical function for the first knowledge sharing source P is equal or greater than a threshold value for the first knowledge sharing source P;
the third Boolean variable is dependent on whether the output value of the third mathematical function for the node R is equal or greater than a threshold value for node R; and
the fourth Boolean variable is dependent on whether the output value of the fourth mathematical function for the second knowledge sharing source P2 is equal or greater than a threshold value for the second knowledge sharing source P2.

32. The computer system of claim 31, wherein the first, second, third and fourth mathematical functions are activation functions.

33. The computer system of claim 29, wherein:
a training data set T is available to train the neural network N;
the set of training data D1 is a subset of the training data set T;
the second set of training data D2 is a subset of the training data set T; and
the computer memory further stores software that, when executed by the one or more processors cores, causes the one or more processor cores to determine:
data in the training data set T that are to be used for the set of training data D1; and
data in the training data set T that are to be used for the second set of training data D2.

34. The computer system of claim 20, wherein the specified relationship is that outputs of the first and second mathematical functions are equal on the training data set D1.

35. The computer system of claim 20, wherein:
the first knowledge sharing source P has a known interpretation; and
the specified relationship is that the known interpretation of the first knowledge sharing source P equals an interpretation for node R on the training data set D1.

36. The computer system of claim 35, wherein the known interpretation of the first knowledge sharing source P is an output category of a classifier.

37. The computer system of claim 20, wherein:
the specified relationship is a relationship between a first Boolean variable and a second Boolean variable;
the first Boolean variable is dependent on whether the output value of the first mathematical function for the node R is equal or greater than a threshold value for node R; and
the second Boolean variable is dependent on whether the output value of the second mathematical function for the first knowledge sharing source P is equal or greater than a threshold value for the first knowledge sharing source P.

\* \* \* \* \*